United States Patent [19]

Menashi et al.

[11] 4,320,094

[45] Mar. 16, 1982

[54] PARTITIONING OF REFRACTORY METALS FROM OXIDATION RESISTANT SCRAP ALLOY

[75] Inventors: Jameel Menashi, Lexington; Alkis S. Rappas, Bedford, both of Mass.; Donald A. Douglas, Amherst, N.H.

[73] Assignee: Cabot Corporation, Kokomo, Ind.

[21] Appl. No.: 140,428

[22] Filed: Apr. 15, 1980

[51] Int. Cl.$^3$ ............... C01G 37/00; C01G 39/00; C01G 41/00

[52] U.S. Cl. ......................... 423/56; 423/53; 423/55; 423/58; 423/61; 423/65; 423/306; 423/307

[58] Field of Search ............ 423/55, 58, 61, 65, 423/68, 306, 307, 56

[56] References Cited

U.S. PATENT DOCUMENTS

| | | | |
|---|---|---|---|
| 1,322,485 | 11/1919 | Ekeley et al. | 423/58 |
| 2,187,750 | 1/1940 | Marvin . | |
| 2,654,655 | 10/1953 | Banning et al. | 423/58 |
| 3,607,236 | 9/1971 | Brooks et al. | 423/53 |
| 3,816,094 | 6/1974 | Low et al. | 423/61 |
| 3,816,095 | 6/1974 | Bruen et al. | 423/61 |
| 3,852,059 | 12/1974 | Bruen et al. | 423/61 |
| 4,087,510 | 5/1978 | Steenken | 423/61 |
| 4,112,046 | 9/1978 | Niederprum et al. | 423/61 |

Primary Examiner—Herbert T. Carter
Attorney, Agent, or Firm—Jack Schuman; Robert F. Dropkin

[57] ABSTRACT

Alloy scrap containing refractory metals such as chromium, molybdenum, tungsten, vanadium, niobium and tantalum and base metals such as nickel, cobalt, copper and iron are treated to partition the refractory metal values from the base metal values without an energy intensive remelting step. The scrap in finely divided form is calcined in the presence of an oxygen containing gas and a member of a certain group of alkali metal salts at a temperature in the range of 800° C. to 1150° C. for ¼ hour to four hours. This treatment converts the refractory metals to alkali metal molybdates, tungstates, chromates, vanadates, niobates and tantalates and the base metals to oxides. The calcined product may then be water leached to produce a substantially base metal-free liquor rich in refractory metal values. Both the refractory and the base metal values may be subsequently recovered by conventional hydrometallurgical techniques.

71 Claims, 1 Drawing Figure

PARTITIONING OF REFRACTORY METALS FROM OXIDATION RESISTANT SCRAP ALLOY

BACKGROUND OF THE INVENTION

This invention relates to the separation of refractory metals such as chromium, molybdenum, vanadium, tungsten, niobium and tantalum from base metals such as nickel, cobalt, copper, and iron and to convert the refractory metals to a water-soluble form suitable for subsequent hydrometallurgical recovery.

The so-called superalloys provide strength and oxidation and corrosion resistance for relatively long periods of time at elevated temperatures, and are currently used in the fabrication of process equipment, steam and gas turbines and the like. They comprise a class of iron, nickel, and cobalt based materials alloyed with chromium, tungsten, molybdenum, niobium, and/or tantalum. Some superalloys also include relatively small percentages of aluminum and silicon.

Currently, a significant volume of superalloy scrap is produced in the United States in the form of fines, dust, grindings, and metal turnings. Because of the high value of the metals in the alloys, various processes have been developed which seek to provide an economical means of recovering metal products in commercially useful form from the scrap. However, because of the oxidation resistant and corrosion resistant nature of the so called super-alloys, recycling of this material poses many problems. Thus, no commercial process for such recycling is trouble free.

Furthermore, since these metallic wastes are often mixed with and are highly contaminated with either cutting oils and/or grinding media such as aluminum oxide and silicon carbide, they are unsuitable for direct remelting.

As is stated above, various processes have been developed which seek to provide an economical means of recovering commercially useful products from the scrap. One such process is disclosed in U.S. Pat. No. 3,649,487 to Aue et al. The Aue et al process involves pretreatment of the metal scrap with a group III, IV or V non-metal to tie up the molybdenum, tungsten, and chromium values as carbides, borides, silicides, nitrides, and/or phosphides. Anodes cast from this secondary material are placed in an electrolytic bath and are subjected to an electrolytic dissolution at low voltages such that the refractory metals are not dissolved or decomposed, whereby the nickel, cobalt, iron, and copper (if present) content may be recovered.

The foregoing process suffers from the disadvantage that the alloys must be remelted to produce the secondary material. Thus, the input of large amounts of energy is required and is expensive and, is prohibitively so for superalloy scrap relatively high in Fe content and low in Ni and Co content. Furthermore, carbiding has proved only marginally effective in inhibiting Cr dissolution in the electrochemical dissolution process. Consequently, additional operations are required to remove this contaminant from the electrolyte prior to the electrowinning of the base metals.

Various hydrometallurgical processes for recovering refractory metals are known in the art, but these are complicated by the presence of relatively large quantities of iron, nickel, cobalt, copper and mixtures thereof.

For example, U.S. Pat. No. 3,607,236 to P. T. Brooks discloses a method of reclaiming metal values from superalloy scrap. The Brooks process involves relatively unselective dissolution of the scrap in a chlorinated acidic aqueous solution and subsequent removal of tungsten, molybdenum, iron, cobalt, chromium and nickel from pregnant leach liquors by various extraction techniques.

If an energy efficient method of separating chromium, molybdenum, tungsten, vanadium, niobium, tantalum, and mixtures thereof from materials containing one or more metals such as nickel, cobalt, copper and iron were forthcoming, conventional hydrometallurgical recovery techniques could be utilized to greater advantage.

SUMMARY OF THE INVENTION

It has now been discovered that despite the oxidation and corrosion resistant nature of superalloys, they are nevertheless susceptible under certain conditions to oxidation by calcination in the presence of an oxygen containing gas and an alkali metal salt selected from the group consisting of alkali metal carbonates, bicarbonates, or hydroxides. As a result of the calcination, the refractory metals are converted to water soluble chromates, molybdates, tungstates, niobates and tantalates. The iron, nickel, cobalt and/or copper values are converted to essentially insoluble oxides. Thus, on leaching with water, the refractory metal values may be partitioned from the remainder of the calcination product as a substantially nickel, iron, copper and cobalt-free pregnant liquor. Advantageously, the calcination and subsequent leaching require little energy input as the oxidation reactions are exothermic.

The calcination requires a scrap feed material in a relatively fine particle form. Therefore, the maximum particle size which can be tolerated will depend on alloy type and calcination conditions. Thus, with highly oxidation resistant alloys, it is found that feeds comprising particles with an average particle size of about 400–500 microns can be oxidized substantially completely in the presence of the alkali metal salt selected from the group consisting of carbonates, bicarbonates or hydroxides. Furthermore, in the presence of finely divided materials, highly oxidation resistant turnings or other scrap having dimensions of the order of 1 mm may be treated with success.

A further attractive aspect of the process of the invention is that less oxidation-resistant alloy scrap may be mixed with the superalloy. Thus, hardfacing grindings and tool steel scrap (often containing vanadium values) may be treated together with the superalloy. In this situation, the vanadium values are leached and can be subsequently recovered. Also, chromite ores ($Cr_2O_3$), wolframite ores (Fe, Mn, $WO_4$), and spent catalysts (CoO, $WO_3$, NiO, and $MoO_3$) may be included with the scrap. Of course, the process disclosed herein may be used to great advantage in recovering refractory metal values such as chromium, tungsten, etc. from a feed stock that is comprised of 100% of less corrosion resistant material such as tool steel grindings, hard face grindings and stainless steel.

The proportion of oxidic ores or spent catalysts mixed with metallic scrap can be varied over a wide range. It is, however, proposed to mix the ore or catalyst with the metallic scrap in such a proportion that the exotherm resulting from the oxidation of the metal values in the metallic scrap is sufficient to raise the temperature of the mixed feed to the desired level.

Scrap metal feed for treatment in the process will often contain a residue of cutting oil. The oil per se presents no substantial difficulty since at the temperature of the calcination, it is readily oxidized. However, such oils often contain phosphorous, a portion of which may be converted to phosphate during calcination and leached together with the refractory metals. Since the presence of phosphorus in the leach solution can alter the chemistry of subsequent purification steps, especially when they involve an acid medium, it is preferred to reduce the phosphorus content of the leach liquor to a sufficiently low level that the phosphorus to tungsten weight fraction in the leach solution is less than 0.001. Typically, the leach solution contains 20–30 g/l of tungsten so that it is preferred to reduce the phosphorus level to about 0.02 grams per liter before beginning metal recovery. In accordance with the invention, phosphorous may be removed from the pregnant liquor by adding ammonia, preferably as ammonium hydroxide, and magnesium ions to the solution to produce a $MgNH_4PO_4$ precipitate without substantially contaminating the leached liquor with magnesium. Alternatively, the pH of the alkaline pregnant leached liquor may be reduced to a level at which the bicarbonate species predominates (as opposed to carbonate) and thereafter; magnesium ion can be added to precipitate a $MgHPO_4$ solid. Subsequent refractory metal recovery steps will dictate which approach is best.

Alternatively, the magnitude of the phosphorus removal step may be substantially reduced or even eliminated by removing the cutting oil by a conventional degreasing operation. It has now been discovered that the oil can be essentially completely removed by heating the feed material in a non-oxidizing atmosphere at a temperature of 300°–400° C. upon which the oil is distilled off.

Accordingly, it is an object of the invention to provide a method of partitioning refractory metals from nickel, cobalt, iron and/or copper values in oxidation and corrosion resistant superalloys. Another object of the invention is to convert the refractory metal values in a single pass operation to water soluble chromates, molybdates, tungstates, vanadates, niobates and tantalates. Another object of the invention is to remove phosphate contaminates from aqueous alkaline leach liquors containing refractory metals. Another object of the invention is to convert alloy scrap into a pregnant liquor rich in refractory metals, and a solid oxidized product rich in nickel, copper, cobalt and/or iron to facilitate the subsequent recovery of the metals by conventional techniques.

These and other objects and features of the invention will be apparent to those skilled in the art from the following description of a preferred embodiment and from the drawing wherein the sole FIGURE is a schematic flow diagram illustrating the processing steps for effecting the partition of the invention.

DESCRIPTION OF THE PREFERRED EMBODIMENT

At the heart of the invention is the discovery that alloys containing one or more refractory metals such as chromium, molybdenum, tungsten, vanadium, niobium and tantalum values and one or more base metal values such as nickel, cobalt, copper and/or iron may be treated to partition the refractory metal values from the base metal values without an energy intensive remelting step. Broadly, the partition is accomplished by calcining scrap alloy grindings, dusts, and/or fines in the presence of an oxygen containing gas and an alkali metal carbonate, bicarbonate, or hydroxide at a temperature above about 800° C., preferably 950° C. to 1150° C. Any alkali metal ion is useable in the process, although sodium ion is the preferred alkali metal ion. Surprisingly, it has been found that subject to certain particle size limitations of the scrap feed and to the presence of sufficient alkali metal salt, a recovery in excess of 90% of the refractory metal values contained in the scrap can be achieved as water soluble anions. For example, if a vanadium containing feed is used, on the order of 90% or more of the vanadium values report in the leach liquor as vanadates. The copper, nickel, cobalt, and iron values, on the other hand, are converted to water insoluble metal oxides. Accordingly, a subsequent leach of the calcined product with water will produce an iron, nickel, copper and/or cobalt rich mixture of oxides as a leach residue and a leach liquor loaded with chromate, tungstate, vanadate, molybdate, niobate or tantalate ions and mixtures thereof. The metals of interest in the leach residue, particularly nickel and cobalt, may be reduced and subsequently recovered by conventional hydrometallurgical techniques such as an ammoniacal leach which separates the iron from nickel, cobalt, and/or copper. Chromium, tungsten, vanadium, molybdenum, niobium and tantalum may likewise be separated and recovered from the pregnant leach liquor by conventional hydrometallurgical techniques.

The class of alloys which may be accommodated by this process include superalloy, hardfacing, tool steel and stainless steel scrap in the form of turnings, grindings, dusts and/or fines. The feeds may be treated either individually or mixed in any desired combinations. In addition, oxidic ores or spent catalysts may be mixed with the metallic scrap.

As the particle size of the material increases, its rate of oxidation decreases. Thus, when highly oxidation resistant superalloy turnings having, after shredding, a nominal size of about 1 mm are used as feed, significantly less than half of the refractory metal values thereof are converted to a water leachable form. Accordingly, for high recoveries of the refractory metal values, a substantial fraction of the scrap must be present in a finely divided form. The average particle size of grindings, dusts and/or fines will often be available well within the desired size range. Particle size reduction, however, may be required in particular cases.

While the presence of alloy scrap in a finely divided form as mentioned above is essential to the success of the invention, it has been discovered that a mixed feed of finely divided material and larger scrap having nominal dimensions in the 500 to 2000 micron range are well suited for treatment. It is believed that the successful calcination of the larger scrap is due to the fact that the finely divided component of the feed is capable of retaining molten alkali metal salts within the bulk and thus ensure a good contact between the reacting metal surface, alkali metal values and the oxygen. Without the fines, the molten alkali metal salts will drain off the larger metal particles, thus separating the reacting species.

Often, such scrap materials will be contaminated with cutting oils. The bulk of such contaminates may be removed by conventional degreasing techniques or by distillation, and that which is not removed is readily oxidized and volatilized at the temperature of the calcination. However, the cutting oil contaminants frequently include a phosphorous component, at least a fraction of which is oxidized to phosphate during the calcination and leached together with the refractory metals of interest. Since the presence of $P^{+5}$ in leach liquors can interfere with the acidic reactions which may subsequently be employed to recover and separate the refractory metals, it is preferred to remove phosphate from the leached liquor. This may be accomplished by two related, but separate methods.

In the first, when a carbonate or bicarbonate alkali metal salt has been during the calcination, the concentrated leach liquor will contain significant amounts of carbonate ions. In order to reduce the level of carbonate ions in solution, the pH of the pregnant liquor is reduced with, for example, carbon dioxide so that the equilibrium:

$$H^+ + CO_3^{2-} \rightleftharpoons HCO_3^-$$

is pushed to the right so that the predominant species is bicarbonate. In addition, the pH must be maintained at such a level that significant amounts of the phosphate is present as the $HPO_4^{2-}$ species. The exact optimum pH for ensuring that the $HCO_3^-$ species predominates while the phosphate species is present mainly as $HPO_4^{2-}$ depends on solution temperature and ionic strength. With essentially saturated leach solutions maintained at 80° C., the optimum pH for phosphate removal is in the range of 7.5 to 9.0 and preferably at about 8.5. Thereafter, magnesium ion is added to the liquor to precipitate $MgHPO_4$. The conversion of the bulk of the $nCO_3^{2-}$ ions to $HCO_3^-$ is necessary in order to prevent excessive consumption of $Mg^{+2}$ by precipitating $Mg^{+2}$ as $MgCO_3$ which has a solubility product which is the same order of magnitude as that of $MgHPO_4$. In order to lower the phosphate level to the acceptable range (below about 0.02 grams per liter), substantial quantities of magnesium ion must be added. This results in a certain amount of contamination of the leached liquor with free magnesium ion. Depending on the choice of subsequent metal recovery steps, this may be tolerable and accordingly comprises a suitable technique under certain conditions.

The second method involves the formation of $MgNH_4PO_4$. In order to effect the precipitation of $MgNH_4PO_4$, pH control must again be employed. The pH of the system must be reduced to a level such that $Mg^{+2}$ is not removed from solution as $Mg(OH)_2$ but is utilized in formation of $MgNH_4PO_4$. The optimum pH for effecting this precipitation depends on solution temperature and ionic strength. With essentially saturated leach solutions at 80° C. the optimum pH is within the range of 8.5 to 10.0 and preferably at about pH 9.0. The $MgNH_4PO_4$ has a very low water solubility and thus, magnesium contamination of the solution is much less of a problem. However, it involves the addition of both $Mg^{+2}$ (as MgO or $Mg(OH)_2$) and ammonium ion (as $NH_3$ or $NH_4OH$) to the solution. The latter must be present in significant concentrations and must be dealth with subsequently. With essentially saturated leach solution (typically containing about 20-30 g/l $W^{6+}$) adjusted to pH 9.0 at 80° C., the addition of both MgO and $NH_3$ to about 0.04 moles per liter is effective in reducing the phosphate level well below that which creates subsequent processing difficulties.

Often, scrap alloys of the type described above will contain small amounts of aluminum or silicon. During calcination, the bulk of the aluminum and silicon values are converted to water insoluble aluminates and silicates which report to the leach residue. Here they present no significant difficulty since techniques have long been established for selectively recovering nickel, copper, and cobalt in the presence of these contaminants.

However, under some conditions, soluble silicates and aluminates in small percentage may report in the leach liquor. In addition, any other impurity metals present in the scrap such as tin, bismuth and zinc which form water soluble alkali metal salts during the calcination process will report to the leach liquor. These hydrolyzable impurities as well as the aluminates and silicates may be effectively removed by reducing the pH of the leach liquor, either in a separate stage or during the leaching operation itself. At low pH values in the range of pH 7-9.5 the silicon, aluminum and other impurity values are precipitated as hydroxides or hydrated oxides.

Figure 1:
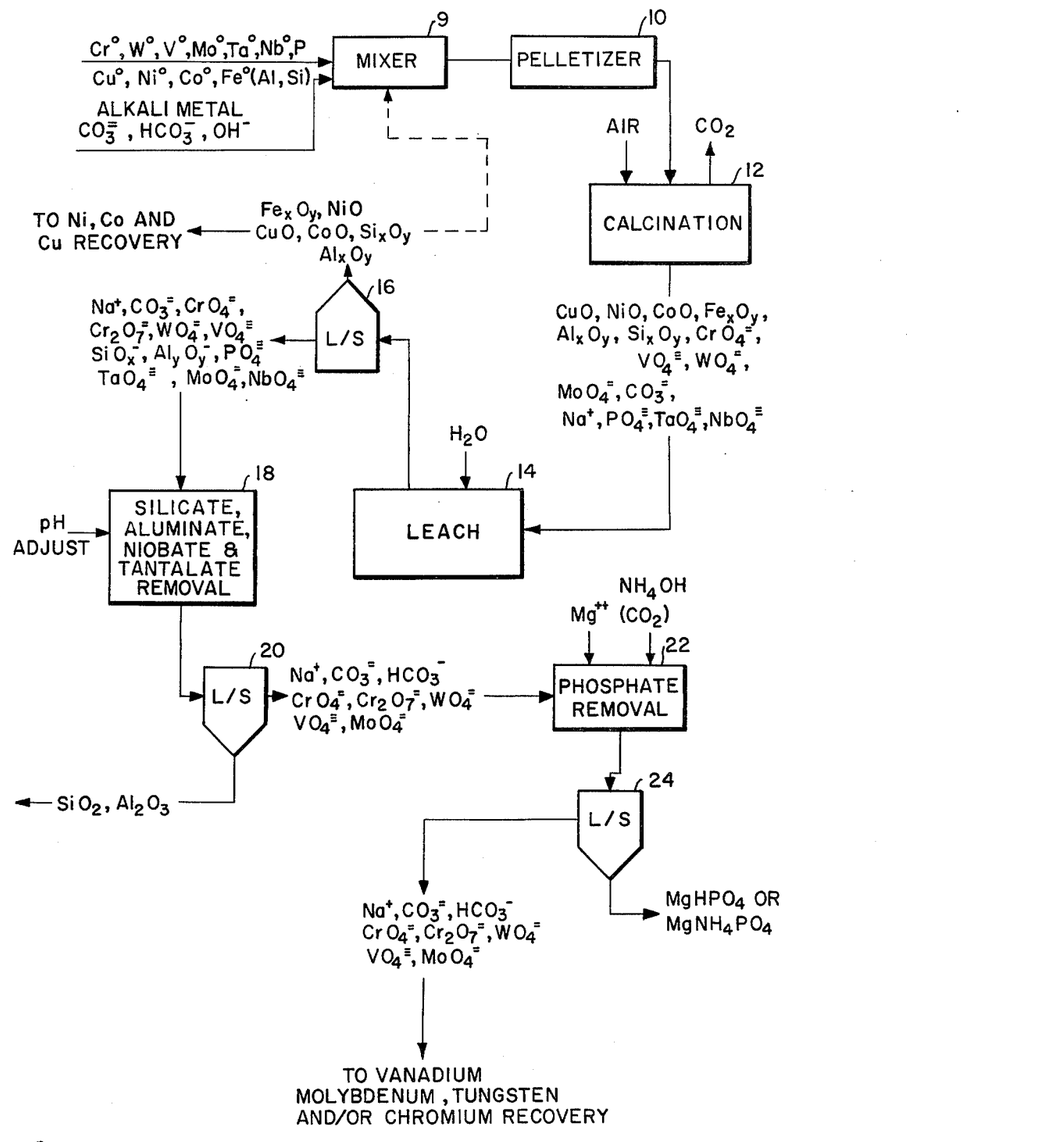

Referring to the drawing, the feed material comprising fine particles of one or more of the types of alloys mentioned above, optionally mixed with oxidic ores such as chromite and/or wolframite and/or spent catalysts, is intimately mixed with the required amount of alkali metal salts in a suitable mixer 9. The feed materials contain, for example, one or more refractory metals such as chromium, tungsten, molybdenum, niobium, tantalum, and one or more base metals such as nickel, cobalt, copper, iron, aluminum and silicon as well as small amounts of phosphorus.

Often a particulate diluent is mixed with the feed material to facilitate the calcination. Suitable diluent materials include iron oxides. Also, a portion of the leach residue produced subsequently may be recycled to the mixer 9 for this purpose. In addition, the alkali metal salt of an alkali metal carbonate, bicarbonate or hydroxide is mixed together with the scrap feed and, if required, the diluent. The preferred alkali metal salt is sodium carbonate. Other salts, e.g. potassium carbonate or bicarbonate or hydroxides of alkali metals may be used, but are more expensive. The ratio of feed material to sodium carbonate is set such that there is a slight stoichiometric excess of alkali metal ions required for combination with the refractory metal values. Large excesses do not significantly increase the effectiveness of the separation and introduce unnecessarily large percentages of sodium and carbonate ions into the subsequently produced leach liquor.

The mixer from mixer 9 is then delivered to pelletizer 10. Small amounts of water or process raffinates are added to aid in the formation of pellets. The pellets are then delivered to a calciner 12 together with an oxygen containing gas (preferably air). The calcination is conducted at a temperature greater than 800° C. and preferably within the range of 950° to 1150° C. Fortunately, the reactions are exothermic and are self-sustaining once initiated. This should be contrasted with the prior art pyrometallurgical separation techniques which require a large heat input.

The calcination product is next delivered to a leaching reactor 14 where it is contacted with water.

As a result of the leach, the iron, nickel, copper, and cobalt, present and most of the silicon and aluminum values (if present) remain undissolved, while any alkali metal chromates, tungstates, vanadates, molybdates, niobates, tantalates, and carbonates formed, and phosphates (if present) are solubilized. A conventional liquid-solid separation is then conducted in separator 16. As indicated, a portion of the solids may be delivered to mixer 9 to be used as a diluent. The remaining solids are delivered to subsequent nickel, cobalt and copper recovery steps.

When the feed material is such that the leach liquor contains acceptably low levels of phosphorus, aluminum, or silicon, or when the subsequent refractory metal recovery steps are such as to conveniently deal with these impurities, the leach liquor may be delivered directly to refractory metal separation and recovery. However, if unacceptable quantities of aluminum, silicon, other hydrolyzable impurities or phosphorus are present in the leach liquor, the liquor is delivered to stages 18 and 22 for further preliminary treatment. In stage 18, the pH of the pregnant liquor is reduced so that the hydrolyzable impurities are precipitated. A subsequent conventional liquid-solid separation in separation stage 20 removes the silicon and aluminum and other impurities. Alternatively, the pH of the leach liquor can be adjusted prior to separation stage 16.

The aqueous phase may also be delivered to phosphate removal stage 22. As described above, phosphate may be precipitated either as a magnesium hydrogen phosphate or magnesium ammonium phosphate. Thus, in stage 22, the pH of the leach liquor may be reduced to a level between 7.5 and 9.0 so that bicarbonate is the dominant species (as opposed to carbonate), and sufficient magnesium ion is added (as MgO, $Mg(OH)_2$ or $MgSO_4$) to reduce the phosphate ion content to acceptable levels. This precipitation method necessarily involves contamination of the leached liquor with some magnesium ion.

Alternatively, the pH of the solution may be reduced to a level between 8.5–10.0 and then magnesium ion may be added to the leach liquor to produce a magnesium ammonium phosphate precipitate. The water solubility of this complex salt is extremely low, and consequently the $Mg^{+2}$ ion concentration in solution may be small. However, a certain quantity of ammonium ion is necessarily introduced into the leach liquor. Precipitated phosphate is removed by a conventional liquid-solid separation at stage 24. Since the pH requirements of stages 14, 18 and 22 are compatible, these unit operations may, if desired, be combined in one step. Thus, the leaching process may be effected at the desired pH in the presence of $Mg^{+2}$ ions (and if desired $NH_4^+$) so as to simultaneously leach the water soluble refractory metal values and precipitate the hydrolyzable impurities together with the phosphate values. The resulting leach liquor, substantially free of hydrolyzable impurities and phosphorus as well as iron, cobalt, nickel and copper, may then be delivered to conventional hydrometallurgical process steps for the separation and recovery of one or more of the chromium, tungsten, vanadium, molybdenum, niobium and tantalum values present.

The invention will be further understood from the following non-limiting examples:

EXAMPLE 1

In order to establish the feasibility of the alkali metal fusion process, three samples of superalloy grindings (alloys A, B, and C) and a sample of superalloy turnings (alloy A) were obtained. Nominal compositions of these alloys are listed in Table I.

TABLE I

| Nominal Composition Of Grindings And Turnings | | | |
|---|---|---|---|
| | Alloy A wt (%) | Alloy B wt (%) | Alloy C wt (%) |
| Ni | 55.0 | 47.0 | 22.0 |

TABLE I-continued

| Nominal Composition Of Grindings And Turnings | | | |
|---|---|---|---|
| | Alloy A wt (%) | Alloy B wt (%) | Alloy C wt (%) |
| Co | 2.5 | 1.5 | 39.0 |
| Fe | 5.5 | 19.0 | 1.5 |
| Cr | 15.5 | 22.0 | 22.0 |
| Mo | 16.0 | 9.0 | 0.0 |
| W | 3.8 | 1.0 | 14.5 |
| Other | 1.0 | 1.0 | 1.0 |

A screen analysis indicated that the grindings had median particle sizes by weight ranging from about 100 to 140 microns. Grindings were classified by screening to give samples having narrow particle size distributions and average sizes by weight of 75 microns, 90 microns, 160 microns, and 400 microns. The screened samples were each then calcined in air with an equal weight of sodium carbonate at 1100° C. for four hours. Thereafter, each of the samples were leached with water. Each leach residue was remixed with sodium carbonate and subjected to a second calcination and leach process. Analyses of the leach solutions showed that the chromium, molybdenum, and tungsten contents of the first leach solution was at least one order of magnitude larger than that of the second solution. Furthermore, emission spectrographic data indicated that the second leach residue had little or no molybdenum, tungsten or chromium. These data indicate that essentially complete conversion of the metals of interest to their corresponding water soluble sodium salts was obtained after two calcinations. The percentage of the metals solubilized in the first leach solution was then determined. The results obtained are summarized in Table II.

TABLE II

| Percent Metal Leached After A Single Calcination At 1100° C. For Four Hours | | | | | | | | |
|---|---|---|---|---|---|---|---|---|
| | ALLOY B | | ALLOY A | | | ALLOY C | | |
| NOMINAL SIZE Microns | Mo wt (%) | Cr wt (%) | Mo wt (%) | W wt (%) | Cr wt (%) | Mo wt (%) | W wt (%) | Cr wt (%) |
| 75 | 99.2 | 99.8 | 99.8 | 99.1 | 99.7 | 93.3 | 98.4 | 98.8 |
| 90 | 98.6 | 99.6 | — | — | — | 71.8 | 94.1 | 94.0 |
| 160 | 98.1 | 99.3 | — | — | — | 89.3 | 99.5 | 98.7 |
| 400 | 96.3 | 98.3 | 99.8 | 98.7 | 99.5 | 91.8 | 99.9 | 96.7 |

The data in Table II indicate that grindings with nominal sizes up to about 400–500 microns can be calcined with $Na_2CO_3$ and leached in water to solubilize a major portion (generally in excess of 90%) of their molybdenum, tungsten, and chromium values. Moreover, the percentage of metal solubilized appears in two cases to decrease only slightly with increase in particle size. In the third case, (alloy C) it is believed that the effect of particle size was masked by experimental error.

EXAMPLE 2

The effect of the percent stoichiometric excess of sodium carbonate utilized in the calcination process on the percent metal solubilized is shown in Table III. The stoichiometric $Na_2CO_3$ requirement is defined as the theoretical amount of $Na_2CO_3$ required to react with all the Cr, Mo and W values in the alloy.

TABLE III

Effect Of Stoichiometric Excess Of $Na_2CO_3$ On Percent Metal Leached

| $Na_2CO_3$ Stoichiometric Excess (%) | Mo (%) | W (%) | Cr (%) |
|---|---|---|---|
| 10 | 96.2 | 95.6 | 92.2 |
| 20 | 92.2 | 91.8 | 88.8 |
| 88 | 96.3 | — | 98.3 |

These data were obtained using alloy B with a 1100° C. calcination and subsequent leach as set forth in Example 1, with the various stoichiometric excesses of sodium carbonate set forth.

The foregoing results indicate that at reasonable stoichiometric excesses, adequate solubilization of the metals of interest are obtained.

EXAMPLE 3

In order to evaluate the effect of increasing scrap particle size on the efficiency of the sodium carbonate fusion (calcination) and leach process, alloy A turnings were cut to pieces measuring on average, in a first sample, 5700×8000×635 microns, and in the second sample, 1400×8000×635 microns. These two samples were mixed with an equal weight of sodium carbonate and calcined for four hours at 1100° C. The products of calcination each suffered a substantial weight loss indicating that a large fraction of the sodium carbonate was lost by vaporization. After leaching, a major portion of the samples retained their original shape, indicating that they had undergone little oxidation, and the leach solution contained only 15 to 30% of the metal values of interest. It thus may be concluded that the present sodium carbonate fusion and leach process is inadequate for the recovery of molybdenum, tungsten, and chromium values from superalloy scrap samples significantly larger than typical grindings.

EXAMPLE 4

In the case of mixtures of shredded turnings and grindings, much better recoveries are obtained as compared with grinding-free turnings. Mixtures of shredded turnings (570×800×635 microns) and grindings of alloy A were calcined in air at 1100° C. with sodium carbonate and subsequently leached. The relative amounts of shreadings and grindings and the percentage of metal recoveries are shown in Table IV.

TABLE IV

Percent Metal Solubilized Using Mixtures Of Shredded Turnings And Grindings (Alloy A)

| Wt. Ratio of Shred. Turn.:Grindings | Wt. Percent Metal Leached | | |
|---|---|---|---|
| | Mo | W | Cr |
| 1:1 | 96 | 95 | 85 |
| 1:2 | 98 | 98 | 93 |
| 1:5 | 99 | 95 | 95 |

The data in Table IV indicate that the mixture of shredded turnings and grindings can be utilized in the process. The suitability of mixtures of small and larger scrap is attributed to the oxidation of grindings at 1100° C., especially in the presence of $Na_2CO_3$, being rapid and highly exothermic. Presumably, the fine particle size fraction retains the $Na_2CO_3$ values and the combination of the alkali metal salt and the high temperature is sufficient to oxidize the shredded turnings. However, scrap having a particle size significantly in excess of the grindings set forth above must be reduced in size in order to be used.

EXAMPLE 5

Tool steel grindings containing 3.7% chromium, 3.6% molybdenum, 2.1% tungsten, 1.5% vanadium, about 4% silicon, and about 6% aluminum were fused with a 20% excess of the stoichiometric requirement of sodium carbonate required to combine with the refractory metal values and calcined in a muffle furnace for various periods of time at 950° C. and then leached in water. The effect of calcination time on the percent of metal leached is summarized in Table V.

TABLE V

Effect Of Calcination Time (At 950° C.) On Metal Values Leached In Water

| Calcination Time (hrs) | Cr % | Mo % | W % | V % |
|---|---|---|---|---|
| 0.25 | 51 | 85 | 85 | 48 |
| 0.5 | 53 | 85 | 85 | — |
| 1.0 | 53 | 85 | 84 | — |
| 2.0 | 53 | 85 | 85 | — |
| 4.0 | 54 | 85 | 85 | — |
| 16.0 | 57 | 90 | 89 | — |

These data indicate that the initial rate of the reaction of the refractory metals in the scrap with sodium carbonate is rapid. Within a period of 15 minutes, reasonably large percentages of chromium, molybdenum, tungsten and vanadium were converted to their respective sodium salts. Thereafter, however, prolonged reaction times are required for further gains in the extent of metal values leached.

EXAMPLE 6

A composite sample of hardfacing grindings containing about 20% oil was analyzed. The analysis indicates that the average percent composition of the sample hardfacing grindings (oil-free basis) were as follows:

TABLE VI

Percentages Of Metals Of Interest Present In Hardfacing Grindings

| Element | Percent Composition |
|---|---|
| Ni | 12.9 |
| Co | 18.7 |
| Fe | 14.4 |
| Cr | 18.0 |
| Mo | 0.14 |
| W | 10.3 |
| Al | 4.3 |
| Si | 0.3 |
| Insolubles | 17.7 |

The effect of varying the amount of sodium carbonate used on the extent of tungsten and chromium converted to their respective sodium salts was determined by fusing 2 gram samples of the oil-free grindings with 0.06 to 1.0 gram sodium carbonate in platinum crucibles overnight at 850° C. The fused samples were subsequently leached in water, and the leach solution was analyzed for tungsten, chromium, silicon and aluminum values. In all cases, the silicon and aluminum values were negligably small. The results obtained are presented in Table VII.

TABLE VII

Effect of Fusion of 2g Oil-Free Grindings with $Na_2CO_3$ at 850° C. for 16 hours

| Wt $Na_2CO_3$ Added, g | Wt Residue, g | % Metal Leached W | % Metal Leached Cr | $Na_2CO_3$ utilization, % |
|---|---|---|---|---|
| 0.06 | 2.34 | 45.1 | 00.0 | 89 |
| 0.12 | 2.28 | 52.9 | 3.1 | 72 |
| 0.2 | 2.27 | 60.7 | 9.7 | 72 |
| 0.3 | 2.18 | 63.1 | 15.6 | 63 |
| 0.44 | 2.06 | 65.0 | 34.4 | 75 |
| 0.60 | 2.04 | 101.9 | 66.7 | 102 |
| 0.80 | 1.18 | 99.0 | 69.4 | 78 |
| 1.00 | 1.82 | 107.8 | 106.7 | 91 |

The $Na_2CO_3$ utilization column in the table indicates the percentage of the $Na^+$ values, added as $Na_2CO_3$, utilized in forming the water soluble $Na_2CrO_4$ and $Na_2WO_4$. As shown, sodium carbonate utilization appears to vary considerably, probably as the result of experimental error. On the average, the $Na_2CO_3$ usage factor is about 80%. As expected, the amount of tungsten leached increases with increases in sodium carbonate level. However, high percentages of tungsten are leached only when substantial amounts of chromium are also leached.

EXAMPLE 7

The effect of calcination time at 850° C. of hardfacing grindings on the extent of metal values leached is given in Table VIII.

TABLE VIII

Effect of Calcination Time at 850° C. on Extent of $W^{+6}$ and $Cr^{+6}$ Extraction in Percent

| *$Na_2CO_3$ level, g | 0.5 hours W | 0.5 hours Cr | 2 hours W | 2 hours Cr | 16 hours W | 16 hours Cr |
|---|---|---|---|---|---|---|
| 0.44 | 44 | 36 | 66 | 33 | 65 | 34 |
| 0.60 | 59 | 53 | 82 | 50 | 100 | 67 |
| 1.00 | 83 | 81 | 100 | 81 | 100 | 100 |

*Added to 2g Oil-Free Hardfacing Grindings

In general, the extent of metal leached increases slightly with increases in calcination time in the time interval studied. The data again indicate that there is an initial rapid rate of formation of the sodium salts of tungsten and chromium, followed by a very slow rate of increase.

EXAMPLE 8

In order to show the importance of ensuring that conditions are maintained where good mass transfer of oxygen from the air to the sample results, mixtures of oily tool steel grindings were mixed with $Na_2CO_3$, pelletized and calcined at two bed depths. In one case, the bed depth was about ⅜ inches (a single layer of pellets was utilized). In the second case a 2-inch bed depth was utilized. The samples, placed in crucibles, were calcined in a mufflued furnace at 950° C. for one hour. Equal weights of each of the calcined products were leached in equal volumes of water. The amount of $Cr^{+6}$ solubilized in the case where a thin layer of material was calcined exceeded by at least one order of magnitude the amount of $Cr^{+6}$ solubilized in the thick bed case.

EXAMPLE 9

The effect of the addition of inert diluent on yield was studied by calcining mixtures of oil contaminated hardfacing grindings diluted with various amounts of iron oxide mixed with sodium carbonate and the percent metal extracted after leaching was determined. The data obtained are summarized in Table IX.

TABLE IX

Effect of Diluent Addition

| Parts Oily H.F. | Parts $Fe_2O_3$ | Parts $Na_2CO_3$ | 0.5 hours W | 0.5 hours Cr | 1 hour W | 1 hour Cr |
|---|---|---|---|---|---|---|
| 100 | 0 | 20 | 81 | 44 | 87 | 48 |
| 100 | 80 | 20 | 60 | 28 | 64 | 31 |
| 100 | 0 | 43.6 | 96 | 82 | 96 | 82 |
| 100 | 33 | 43.6 | 91 | 61 | 93 | 64 |
| 100 | 67 | 43.6 | 82 | 57 | 86 | 59 |

These data show that as diluent is added, leach yield decreases. Accordingly, should particular feed materials result in the production of a sticky mass that adheres to the calcination equipment, the minimum amount of diluent should be added to overcome this problem.

EXAMPLE 10

Aliquots of 1 M $MgSO_4$ solution were added to a synthetic leach solution at pH 8.5 and containing 0.081 moles of $P^{+5}$ (2.5 grams $P^{+5}$/l). A white precipitate resulted. It was found that as magnesium sulphate was added, the $Mg^{++}$ concentration remained low (less than about 0.004 grams per liter) until at least the stoichiometric amount required to form $MgHPO_4$ was added. Thereafter, the $Mg^{++}$ content of the solution rapidly increased with further additions of $MgSO_4$. Repetition of this experiment using a real leach liquor having a pH of about 8.5 at 80° C. (where $HCO_3^-$ is the predominant species), showed that the $P^{+5}$ content of the leached liquor can be reduced to about $1 \times 10^{-3}$ mole per liter. In such solutions, it is anticipated that the maximum concentration of $HCO_3^-$ and $CO_3^{--}$ will not exceed about 0.5-1 moles per liter.

At a pH of 8.5 at 80° C. the bulk of the $Mg^{+2}$ added to the solution is utilized in precipitation of $MgHPO_4$. Furthermore, at this solution pH and temperature the level of $Mg^{+2}$ in solution required to obtain a $P^{+5}$ concentration of $1 \times 10^{-3}$ moles per liter is about 0.7 g/l $Mg^{+2}$.

EXAMPLE 11

A leach solution containing 0.75 moles per liter combined carbonate and bicarbonate, with 0.4 moles per liter ammonium hydroxide at pH 9 and 80° C. when treated with $MgSO_4$, results in a solution having a $P^{+5}$ concentration of about $1 \times 10^{-3}$ mole per liter and a white precipitate of $MgNH_4PO_4$.

EXAMPLE 12

A series of experiments was undertaken in order to determine the effect of various parameters on the calcination of tool steel grindings (TSG) containing approximately 25 wt % cutting oil. These experiments were carried out in an indirectly fired 2 inch diameter rotary kiln, 3 ft. long. The variables studied and their ranges are given in Table X:

TABLE X

Two-level Factorials Statistical Design

| Independent Variables | Range (0) | Range (−) | Range (+) | Units |
|---|---|---|---|---|
| T-Temperature | 1025 | 950 | 1100 | °C. |
| N-$Na_2CO_3$ (TSO + $Na_2CO_3$) | 20.1 | 17.8 | 22.4 | % |

TABLE X-continued

| Two-level Factorials Statistical Design | | | | |
|---|---|---|---|---|
| | Range | | | |
| Independent Variables | (0) | (−) | (+) | Units |
| t-Overall residence time | 2.0 | 1.0 | 3.0 | hrs |
| d-pellet diameter | ¼ | ⅛ | ⅜ | inch |

The dependent variables, or responses, were the recovery yields for each refractory metal of interest, $\%Y_{Me}$, defined as the percentage of the metal value leachable in water as a result of the calcination. The composition of the tool steel grindings used is given in Table XI.

TABLE XI

| TSO = TSG + Oil | TSG = tool steel grindings |
|---|---|
| (Oil/TSO) × 100 = 25% | |
| | TSG % wt | TSO % wt |
| Cr | 2.4 | 1.8 |
| Mo | 5.6 | 4.2 |
| W | 1.9 | 1.4 |
| V | 1.6 | 1.2 |
| Fe | 45 | 33.8 |
| Other | 43.5 | 22.6 |
| Oil | — | 25.0 |

Table XII shows the relation between the $Na_2CO_3$ wt %, N, and the "useful stoichiometry factor" which is defined as the multiplier of the calculated stoichiometric amount of $Na_2CO_3$ required to convert completely all the refractory metal values (Cr, Mo, W, V) to their corresponding water soluble sodium salts, excluding any amount which may be consumed by Al, Si, etc.

TABLE XII

| | $Na_2CO_3$/TSO Mixtures | |
|---|---|---|
| Useful* Stoich. Factor | $\frac{Na_2CO_3}{TSO + Na_2CO_3} \times 100, \%$ | $\frac{Na_2CO_3}{TSG + Na_2CO_3} \times 100, \%$ |
| 1.4 | 15.29 | 19.40 |
| 1.47 | 15.93 | 20.17 |
| 1.54 | 16.57 | 20.94 |
| 1.68 | 17.80 | 22.41 |
| 1.82 | 19.01 | 23.83 |
| 1.96 | 20.17 | 25.20 |
| 2.10 | 21.31 | 26.53 |
| 2.24 | 22.41 | 27.80 |
| 2.52 | 24.52 | 30.23 |

*useful stoichiometry: Na for Mo, W, Cr, V only

TABLE XIII

| Dependent variable (response): Recovery yield, $\%Y_{Me}$ | | | | | | | |
|---|---|---|---|---|---|---|---|
| | Variables | | | Responses | | | |
| Trial | T | N | t | $\%Y_{Mo}$ | $\%Y_W$ | $\%Y_{Cr}$ | $\%Y_V$ |
| 1 | 950 | 17.8 | 1 | 91.8 | 92.2 | 45.5 | 70.4 |
| 2 | 1100 | 17.8 | 1 | 94.5 | 93.5 | 48.5 | 72.0 |
| 3 | 950 | 22.4 | 1 | 93.6 | 94.1 | 59.1 | 77.8 |
| 4 | 1100 | 22.4 | 1 | 97.0 | 95.5 | 60.5 | 81.0 |
| 5 | 950 | 17.8 | 3 | 92.6 | 89.0 | 54.0 | 74.6 |
| 6 | 1100 | 17.8 | 3 | 94.3 | 87.4 | 38.0 | 77.8 |
| 7 | 950 | 22.4 | 3 | 96.1 | 91.7 | 70.2 | 85.4 |
| 8 | 1100 | 22.4 | 3 | 95.3 | 92.1 | 62.0 | 78.9 |
| 9 | 1025 | 20.1 | 2 | — | — | — | — |
| Average Yields | | | | 94.4 | 91.9 | 54.7 | 77.2 |

It can be seen, Table XIII, that in the range studied, the most important parameter affecting the recovery yields is the ratio of $Na_2CO_3$ to tool steel grindings. The higher this ratio, the higher the recovery yields are. However, excessively large amounts of $Na_2CO_3$ are undesirable since sticky masses may be produced during calcination. In addition, such excess will put an unnecessary burden on the subsequent hydrometallurgical process steps for the separation of metal values. It was, thus, found that N ~20 wt% $Na_2CO_3$ gives good yields and no sticky masses. N can be as high as about 24% for ⅜" pellets.

EXAMPLE 13

A directly fired 6 inch diameter, 6 feet long, rotary kiln was employed to calcine oily tool steel grindings (TSO). TSO were mixed with $Na_2CO_3$ (4 lb/lb) and pelletized with addition of small quantities of water. The TSO contained about 25 wt% cutting oil. Water content of pellets was between 9 and 15 wt%. The pellets were continuously fed into the kiln at a rate of up to 4.5 lb/hr. The overall residence time in the kiln was about 65 minutes. An oxidizing flame was maintained and sufficient air was blown into the kiln to burn the contained oil completely, oxidize the material and maintain the temperature at below about 1150° C. in the bed. Typically, the bed temperature was above 850° C. for a length of only 3.7 ft, above 900° C. for about 2.5 ft. and above 1000° C. for about 1 ft.

The calcined material was sampled and the remaining quantity was passed through the kiln three more times with sampling in between. It is obvious that passing calcined material through the same kiln three more times is not equivalent to increasing proportionally the residence time during calcination. However, the results in Table XIV are indicative of how the recovery yields for various metals change with increasing calcination time.

TABLE XIV

| | $\%Y_{Me}$, wt% | | | | | |
|---|---|---|---|---|---|---|
| | Cr | Mo | W | V | Al | Si |
| 1st pass | % 45.6 | 91.0 | 87.2 | 65.7 | 3.6 | 7.6 |
| 2nd pass | % 73.6 | 97.0 | 96.4 | 87.6 | 5.4 | 4.4 |
| 3rd pass | % 75.3 | 97.0 | 96.3 | 87.4 | 7.0 | 4.6 |
| 4th pass | % 77.2 | 97.2 | 96.4 | 88.4 | 6.0 | 2.4 |

EXAMPLE 14

The same experimental setup and procedure as in Example 13 were used to calcine mixtures of oily tool steel grindings (TSO) and finely ground chromite ore (~28 %wt Cr).

| | Case A, wt% | Case B, wt% |
|---|---|---|
| TSO | 62.77 | 58.29 |
| Chromite ore | 14.15 | 13.14 |
| $Na_2CO_3$ | 23.08 | 28.57 |

The results of these experiments are given in Table XV.

TABLE XV

| | $\%Y_{Me}$, wt% | | | | | |
|---|---|---|---|---|---|---|
| Passes through kiln | Cr | Mo | W | V | Al | Si |
| | CASE A | | | | | |
| 1× | 71.4 | 97.2 | 94.5 | 90.0 | 6.3 | 13 |
| 2× | 76.1 | 97.1 | 95.5 | 89.5 | 4.4 | 6.3 |
| 3× | 73.1 | 96.7 | 93.8 | 89.4 | 2.1 | 2.8 |
| 4× | 72.3 | 96.9 | 93.6 | 88.8 | 1.7 | 2.6 |
| | CASE B | | | | | |
| 1× | 78.69 | 98.61 | 97.89 | 95.45 | 1.87 | 14.64 |
| 2× | 89.28 | 98.56 | 97.98 | 96.06 | 1.87 | 7.54 |
| 3× | 85.88 | 98.45 | 97.44 | 95.36 | 13.57 | 11.75 |

TABLE XV-continued

| | %Y$_{Me}$, wt% | | | | | |
|---|---|---|---|---|---|---|
| Passes through kiln | Cr | Mo | W | V | Al | Si |
| 4× | | 88.65 | 98.31 | 97.59 | 96.56 | 13.29 | 3.94 |

It can be seen that the process achieves excellent recovery yields for Mo, W and V, although mixing chromite ore containing no such elements to TSO results in a poorer feed to the calciner. Recovery of chromium is good and it is anticipated that recovery yields for Cr in the lower nineties can be obtained if the material spends longer times at higher temperatures (~1000°-1150° C.) in an oxygen rich atmosphere.

EXAMPLE 15

Oxidation of oily tool steel grindings (TSO) requires a large volume of air (oxygen). It was calculated that, depending on the oil content in the TSO, about 70% of the total oxygen required is consumed for burning the oil. It is rather difficult under these conditions to satisfy simultaneously the requirement of an oxidizing atmosphere, fixed optimum temperature range, acceptable linear gas velocity, residence time, etc. Thus, removal of the oil from the feed material would make the operation and control of the calcination step much simpler. On the other hand, the presence of the oil is very useful during pelletization, providing a necessary binding action. In addition, it seems that during the initial calcination stage, the burning oil contributes positively to the increase in pellet porosity with resulting increase in oxygen diffusion rates within the pellet. Thus, degreasing of TSO prior to pelletization, besides being a rather expensive operation, would also deprive the process of the above advantages. Degreasing of grindings containing mixtures of both oil and water based cutting fluids becomes more complicated.

It has now been discovered that all the above advantages in retaining the oil during pelletization and initial burning stages, as well as all the advantages in removing the oil from the burning zone can be retained by operating the process in the following manner:

Oily tool steel grindings, TSO, are mixed with Na$_2$CO$_3$ and pelletized with addition of 9-15 wt% water. The pellets are then heated (300°-400° C.) indirectly by exhaust gases from the calciner in a suitable piece of equipment (rotary drum, distillation column, etc.) to distill off all water and oil which are then condensed, collected and separated. This distillation can be carried out also by direct heating with exhaust gases from the calciner, provided a non-oxidizing atmosphere is assured. It was found that distillation of oil in the above manner leaves behind porous pellets with, typically, better hardness and mechanical integrity than the original pellets. Most of the organic phosphorus compounds used in the cutting oils are also expected to distill off and thus, reduce the magnitude of the previously described phosphorus removal step.

The pellets from which oil and water have been distilled off are then delivered to the calciner to be oxidized. The calcined pellets show good porosity, leachability and high recovery yields for the metals of interest.

The following experiment was carried out to determine how the removal of oil from pelletized oily tool steel grindings/Na$_2$CO$_3$ mixtures, by a preliminary distillation in a nonoxidizing atmosphere, would affect a subsequent oxidizing calcination operation for separation of refractory metals from base metals. Thus, eighty parts by weight of oily tool steel grindings, TSO, were mixed with twenty parts of Na$_2$CO$_3$ and then pelletized by adding some water. The oily tool steel grindings contained approximately 25 weight percent of cutting oil. The final pellets contained about 9-12 weight percent water. The pelletized material was screened to collect pellets having a ⅜" diameter. A 266.5 g batch of such pellets were fed into a 2 inch diameter rotary kiln where they were kept for one hour at 340° C. under a continuous stream of nitrogen (about 500 ml/min, STP). The oil and water vapors were condensed and collected by cooling the off-gas. The oil collected was clear amber in color. The pellets, at the end of the distillation operation were allowed to cool under a nitrogen stream until they reached the ambient temperature before their removal from the kiln. The weight of the distilled pellets was 185.2 g of which 90% was as whole pellets and 10% as powder and smaller fragments. The color of the pellets is grey, lighter in color than the starting material containing the oil. A section of the pellet showed color uniformity throughout the interior of the pellet. Finally, these pellets did not break when dropped on a hard surface from a a height of about 5 feet. Following, the above "distilled" pellets were fed into a 2 inch diameter rotary kiln where they were calcined at 950° C. for one hour in a stream of air to convert the contained refractory metal values to their corresponding water soluble sodium salts. Subsequently, the calcined pellets were crushed and leached in water. The solution was analyzed to determine concentration of solubilized refractory metal values, and the recovery yields for each metal was determined, as described in previous examples. These results are shown in Table XVI where they are compared to the ones obtained from an experiment in which oily pellets, identical in size and composition to the ones above, were directly calcined in a stream of air under exactly the same conditions.

TABLE XVI

| | Recovery Yield, Wt % | | | |
|---|---|---|---|---|
| | Cr | V | W | Mo |
| "Distilled" Pellets | 62.4 | 84.4 | 94.5 | 96.2 |
| Oil Pellets | 52.5 | 75.3 | 93.8 | 94.3 |

Oil aids in the formation of pellets, it also holds the pellets together facilitating their subsequent handling. Removal of oil, which was admixed as described above without desintegration of the pellets, has some important advantages:

a. decreases or eliminates the phosphorus removal operation described earlier;
b. decreases the oxygen demand during calcination by about 70%;
c. the oil can be condensed and recovered; and
d. decreases the amount of heat to be removed from the kiln off-gas.

The invention may be embodied in other specific forms without departing from the spirit and essential characteristics thereof. Accordingly, other embodiments are within the following claims.

What is claimed is:

1. A process for partitioning a refractory metal selected from the group consisting of Cr°, W°, Mo° and mixtures thereof from an oxidation and corrosion resistant alloy selected from the group consisting of nickel base, cobalt base and iron base alloys, said process comprising the steps of:
- A. providing a feed material comprising said oxidation and corrosion resistant alloy, at least about 50% by weight of said alloy being particles having a nominal particle size no greater than about 500 microns, said refractory metal and said base metal being present in metallic form;
- B. calcining said feed material at a temperature greater than about 850° C. in the presence of an oxygen containing gas and an alkali metal salt having a carbonate, bicarbonate, or hydroxide anion to form a water soluble salt selected from the group consisting of alkali chromates, alkali molybdates, alkali tungstates and mixtures thereof and water insoluble oxides selected from the group consisting of nickel oxide, cobalt oxide, iron oxide and mixtures thereof;
- C. water leaching the mixture resulting in step B to dissolve the water soluble salts to produce a water insoluble leach residue and a pregnant leach solution containing a refractory metal ion, said leach solution being substantially free of Fe, Co, and Ni values; and
- D. separating the pregnant leach solution from said water insoluble residue.

2. The process of claim 1 wherein said alkali metal is sodium and said anion is carbonate.

3. The process of claim 2 wherein the calcining temperature is within the range of 950° C. to 1150° C.

4. The process of claim 3 wherein an inert particulate diluent is added to the feed material prior to said calcining step.

5. The process of claim 2 wherein an inert particulate diluent is added to the feed material prior to said calcining step.

6. The process of claim 1 wherein the calcining temperature is within the range of 950° C. to 1150° C.

7. The process of claim 6 wherein an inert particulate diluent is added to the feed material prior to said calcining step.

8. The process of claim 1 wherein an inert particulate diluent is added to the feed material prior to said calcining step.

9. The process of claim 1 wherein said feed material further contains phosphorus, said calcining step results in the production of water soluble phosphates, and after step C, a portion of said phosphates are removed from the leach liquor, magnesium ion being used to form a magnesium-bearing precipitate.

10. The process of claim 2 wherein said feed material further contains phosphorus, said calcining step results in the production of water soluble phosphates, and after step C, a portion of said phosphates are removed from the leach liquor, magnesium ion being used to form a magnesium-bearing precipitate.

11. The process of claim 3 wherein said feed material further contains phosphorus, said calcining step results in the production of water soluble phosphates, and after step C, a portion of said phosphates are removed from the leach liquor, magnesium ion being used to form a magnesium-bearing precipitate.

12. The process of claim 4 wherein said feed material further contains phosphorus, said calcining step results in the production of water soluble phosphates, and after step C, a portion of said phosphates are removed from the leach liquor, magnesium ion being used to form a magnesium-bearing precipitate.

13. The process of claim 5 wherein said feed material further contains phosphorus, said calcining step results in the production of water soluble phosphates, and after step C, a portion of said phosphates are removed from the leach liquor, magnesium ion being used to form a magnesium-bearing precipitate.

14. The process of claim 6 wherein said feed material further contains phosphorus, said calcining step results in the production of water soluble phosphates, and after step C, a portion of said phosphates are removed from the leach liquor, magnesium ion being used to form a magnesium-bearing precipitate.

15. The process of claim 7 wherein said feed material further contains phosphorus, said calcining step results in the production of water soluble phosphates, and after step C, a portion of said phosphates are removed from the leach liquor, magnesium ion being used to form a magnesium-bearing precipitate.

16. The process of claim 8 wherein said feed material further contains phosphorus, said calcining step results in the production of water soluble phosphates, and after step C, a portion of said phosphates are removed from the leach liquor, magnesium ion being used to form a magnesium-bearing precipitate.

17. The process of claim 9 wherein said phosphate removal step is effected by:
- A. adding $NH_3$ and magnesium ion to said solution to produce an $MgNH_4PO_4$ precipitate; and
- B. separating the $MgNH_4PO_4$ precipitate from said pregnant leach liquor.

18. The process of claim 10 wherein said phosphate removal step is effected by:
- A. adding $NH_3$ and magnesium ion to said solution to produce an $MgNH_4PO_4$ precipitate; and
- B. separating the $MgNH_4PO_4$ precipitate from said pregnant leach liquor.

19. The process of claim 11 wherein said phosphate removal step is effected by:
- A. adding $NH_3$ and magnesium ion to said solution to produce an $MgNH_4PO_4$ precipitate; and
- B. separating the $MgNH_4PO_4$ precipitate from said pregnant leach liquor.

20. The process of claim 12 wherein said phosphate removal step is effected by:
- A. adding $NH_3$ and magnesium ion to said solution to produce an $MgNH_4PO_4$ precipitate; and
- B. separating the $MgNH_4PO_4$ precipitate from said pregnant leach liquor.

21. The process of claim 13 wherein said phosphate removal step is effected by:
- A. adding $NH_3$ and magnesium ion to said solution to produce an $MgNH_4PO_4$ precipitate; and
- B. separating the $MgNH_4PO_4$ precipitate from said pregnant leach liquor.

22. The process of claim 14 wherein said phosphate removal step is effected by:
- A. adding $NH_3$ and magnesium ion to said solution to produce an $MgNH_4PO_4$ precipitate; and
- B. separating the $MgNH_4PO_4$ precipitate from said pregnant leach liquor.

23. The process of claim 15 wherein said phosphate removal step is effected by:
- A. adding $NH_3$ and magnesium ion to said solution to produce an $MgNH_4PO_4$ precipitate; and
- B. separating the $MgNH_4PO_4$ precipitate from said pregnant leach liquor.

24. The process of claim 16 wherein said phosphate removal step is effected by:

A. adding NH₃ and magnesium ion to said solution to produce an MgNH₄PO₄ precipitate; and B. separating the MgNH₄PO₄ precipitate from said pregnant leach liquor.

25. The process of claim 17 wherein said leach liquor contains a combined $HCO_3^-$ and $CO_3^{--}$ concentration on the order of 0.75 moles/liter and about 0.04 moles/liter NH₃ is added to said leach liquor.

26. The process of claim 9 wherein said phosphate removal step is effected by:

A. adjusting the pH level of the pregnant leach liquor to a level no greater than about 8.5;

B. adding $Mg^{++}$ ion to the leach liquor to produce an MgHPO₄ precipitate; and C. separating the MgHPO₄ precipitate from said pregnant leach liquor.

27. The process of claim 10 wherein said phosphate removal step is effected by:

A. adjusting the pH level of the pregnant leach liquor to a level no greater than about 8.5;

B. adding $Mg^{++}$ ion to the leach liquor to produce an MgHPO₄ precipitate; and C. separating the MgHPO₄ precipitate from said pregnant leach liquor.

28. The process of claim 11 wherein said phosphate removal step is effected by:

A. adjusting the pH level of the pregnant leach liquor to a level no greater than about 8.5;

B. adding $Mg^{++}$ ion to the leach liquor to produce an MgHPO₄ precipitate; and C. separating the MgHPO₄ precipitate from said pregnant leach liquor.

29. The process of claim 12 wherein said phosphate removal step is effected by:

A. adjusting the pH level of the pregnant leach liquor to a level no greater than about 8.5;

B. adding $Mg^{++}$ ion to the leach liquor to produce an MgHPO₄ precipitate; and C. separating the MgHPO₄ precipitate from said pregnant leach liquor.

30. The process of claim 13 wherein said phosphate removal step is effected by:

A. adjusting the pH level of the pregnant leach liquor to a level no greater than about 8.5;

B. adding $Mg^{++}$ ion to the leach liquor to produce an MgHPO₄ precipitate; and C. separating the MgHPO₄ precipitate from said pregnant leach liquor.

31. The process of claim 14 wherein said phosphate removal step is effected by:

A. adjusting the pH level of the pregnant leach liquor to a level no greater than about 8.5;

B. adding $Mg^{++}$ ion to the leach liquor to produce an MgHPO₄ precipitate; and C. separating the MgHPO₄ precipitate from said pregnant leach liquor.

32. The process of claim 15 wherein said phosphate removal step is effected by:

A. adjusting the pH level of the pregnant leach liquor to a level no greater than about 8.5;

B. adding $Mg^{++}$ ion to the leach liquor to produce an MgHPO₄ precipitate; and C. separating the MgHPO₄ precipitate from said pregnant leach liquor.

33. The process of claim 16 wherein said phosphate removal step is effected by:

A. adjusting the pH level of the pregnant leach liquor to a level no greater than about 8.5;

B. adding $Mg^{++}$ ion to the leach liquor to produce an MgHPO₄ precipitate; and C. separating the MgHPO₄ precipitate from said pregnant leach liquor.

34. The process of claim 1 wherein said feed material also includes vanadium metal values and vanadium values report to the leach liquor as vanadium ions.

35. The process of claim 2 wherein said feed material also includes vanadium metal values and vanadium values report to the leach liquor as vanadium ions.

36. The process of claim 6 wherein said feed material also includes vanadium metal values and vanadium values report to the leach liquor as vanadium ions.

37. The process of claim 3 wherein said feed material also includes vanadium metal values and vanadium values report to the leach liquor as vanadium ions.

38. The process of claim 8 wherein said feed material also includes vanadium metal values and vanadium values report to the leach liquor as vanadium ions.

39. The process of claim 5 wherein said feed material also includes vanadium metal values and vanadium values report to the leach liquor as vanadium ions.

40. The process of claim 7 wherein said feed material also includes vanadium metal values and vanadium values report to the leach liquor as vanadium ions.

41. The process of claim 4 wherein said feed material also includes vanadium metal values and vanadium values report to the leach liquor as vanadium ions.

42. The process of claim 9 wherein said feed material also includes vanadium metal values and vanadium values report to the leach liquor as vanadium ions.

43. The process of claim 10 wherein said feed material also includes vanadium metal values and vanadium values report to the leach liquor as vanadium ions.

44. The process of claim 11 wherein said feed material also includes vanadium metal values and vanadium values report to the leach liquor as vanadium ions.

45. The process of claim 12 wherein said feed material also includes vanadium metal values and vanadium values report to the leach liquor as vanadium ions.

46. The process of claim 13 wherein said feed material also includes vanadium metal values and vanadium values report to the leach liquor as vanadium ions.

47. The process of claim 14 wherein said feed material also includes vanadium metal values and vanadium values report to the leach liquor as vanadium ions.

48. The process of claim 15 wherein said feed material also includes vanadium metal values and vanadium values report to the leach liquor as vanadium ions.

49. The process of claim 16 wherein said feed material also includes vanadium metal values and vanadium values report to the leach liquor as vanadium ions.

50. The process of claim 17 wherein said feed material also includes vanadium metal values and vanadium values report to the leach liquor as vanadium ions.

51. The process of claim 18 wherein said feed material also includes vanadium metal values and vanadium values report to the leach liquor as vanadium ions.

52. The process of claim 19 wherein said feed material also includes vanadium metal values and vanadium values report to the leach liquor as vanadium ions.

53. The process of claim 20 wherein said feed material also includes vanadium metal values and vanadium values report to the leach liquor as vanadium ions.

54. The process of claim 21 wherein said feed material also includes vanadium metal values and vanadium values report to the leach liquor as vanadium ions.

55. The process of claim 22 wherein said feed material also includes vanadium metal values and vanadium values report to the leach liquor as vanadium ions.

56. The process of claim 23 wherein said feed material also includes vanadium metal values and vanadium values report to the leach liquor as vanadium ions.

57. The process of claim 24 wherein said feed material also includes vanadium metal values and vanadium values report to the leach liquor as vanadium ions.

58. The process of claim 25 wherein said feed material also includes vanadium metal values and vanadium values report to the leach liquor as vanadium ions.

59. The process of claim 26 wherein said feed material also includes vanadium metal values and vanadium values report to the leach liquor as vanadium ions.

60. The process of claim 27 wherein said feed material also includes vanadium metal values and vanadium values report to the leach liquor as vanadium ions.

61. The process of claim 28 wherein said feed material also includes vanadium metal values and vanadium values report to the leach liquor as vanadium ions.

62. The process of claim 29 wherein said feed material also includes vanadium metal values and vanadium values report to the leach liquor as vanadium ions.

63. The process of claim 30 wherein said feed material also includes vanadium metal values and vanadium values report to the leach liquor as vanadium ions.

64. The process of claim 31 wherein said feed material also includes vanadium metal values and vanadium values report to the leach liquor as vanadium ions.

65. The process of claim 32 wherein said feed material also includes vanadium metal values and vanadium values report to the leach liquor as vanadium ions.

66. The process of claim 33 wherein said feed material also includes vanadium metal values and vanadium values report to the leach liquor as vanadium ions.

67. The process of claim 1 wherein said feed material also contains a refractory metal value selected from the group consisting of niobium and tantalum and mixtures thereof and the selected refractory metal reports to the leach liquor as niobium ions or tantalum ions or mixtures thereof.

68. The process of claim 1 wherein said feed material is provided as material having a particle size no greater than about 400 microns.

69. The process of claim 1 wherein said feed material comprises up to about 50 percent by weight particles in the range of 500 to 1500 microns, and the remainder thereof comprises material having a particle size less than about 500 microns.

70. The process as set forth in claim 1 wherein said feed material is additionally comprised of a material selected from the group consisting of hardfacing scrap, tool steel scrap, carbided scrap, wolframite ores, chromate ores, and mixtures thereof.

71. A process for partitioning a refractory metal selected from the group consisting of $Cr°$, $W°$, $Mo°$, $V°$, $Nb°$, $Ta°$, and mixtures thereof from an alloy selected from the group consisting of nickel base, cobalt base, copper base and iron base alloys, said process comprising the steps of:

A. introducing a feed material comprising an alloy selected from the group consisting of nickel base, cobalt base, copper base, and iron base alloys into a mixer, at least about 50% by weight of said alloy being particles having a nominal particle size no greater than about 500 microns, said refractory metal and said base metal being present in metallic form;

B. delivering a diluent to said mixer to mix with said feed material, said diluent being a metal oxide;

C. mixing said feed material and said diluent in the mixer and delivering the mixture to a pelletizer and pelletizing the mixture;

D. delivering said pellets to a calciner and calcining said feed material at a temperature greater than about 850° C. in the presence of an oxygen containing gas and an alkali metal salt having a carbonate, bicarbonate or hydroxide anion to form a water soluble salt selected from the group consisting of alkali chromates, alkali molybdates, alkali tungstates, alkali vanadates, alkali niobates, alkali tantalates and mixtures thereof and water insoluble oxides selected from the group consisting of nickel oxide, cobalt oxide, copper oxide, iron oxide, and mixtures thereof;

E. delivering said calcination product to a leach reactor and water leaching the calcination product to dissolve the water soluble salts to produce a water insoluble leach residue and a pregnant leach solution containing a refractory metal ion;

F. delivering the resulting slurry from the leach reactor to a liquid-solid separator and separating the pregnant leach solution from said water insoluble residue;

G. recycling a portion of said solid residue to the mixer as a diluent;

H. directing a remaining portion of said solid to a circuit for the recovery of one or more base metals contained therein; and I. directing the pregnant leach liquor to a circuit for recovery of one or more refractory metals contained therein.

* * * * *